United States Patent
Nicholas et al.

(10) Patent No.: US 11,680,923 B2
(45) Date of Patent: Jun. 20, 2023

(54) TECHNOLOGIES USING SURFACE-MODIFIED PSEUDO-GRAPHITE

(71) Applicants: ABB Schweiz AG, Baden (CH); University of Idaho, Moscow, ID (US)

(72) Inventors: Nolan Nicholas, Granby, CT (US); Ignatius Cheng, Moscow, ID (US); Haoyu Zhu, Moscow, ID (US); Jeremiah D. Foutch, Keller, TX (US); Yixin Liu, New Britain, CT (US); Saumya Sharma, Hartford, CT (US)

(73) Assignees: ABB SCHWEIZ AG, Baden (CH); UNIVERSITY OF IDAHO, Moscow, ID (US)

( * ) Notice: Subject to any disclaimer, the term of this patent is extended or adjusted under 35 U.S.C. 154(b) by 422 days.

(21) Appl. No.: 16/292,325

(22) Filed: Mar. 5, 2019

(65) Prior Publication Data
US 2020/0284751 A1 Sep. 10, 2020

(51) Int. Cl.
*G01N 27/30* (2006.01)

(52) U.S. Cl.
CPC ......... *G01N 27/308* (2013.01); *G01N 27/307* (2013.01); *G01N 27/301* (2013.01)

(58) Field of Classification Search
CPC ........... G01N 33/1806; G01N 33/1866; G01N 33/543; G01N 27/327; G01N 27/308; G01N 27/4167; G01N 27/4168; C12Q 1/00; H01M 4/96; H01M 4/9008
See application file for complete search history.

(56) References Cited

U.S. PATENT DOCUMENTS

| | | | |
|---|---|---|---|
| 4,725,422 A | 2/1988 | Miyabayashi et al. |
| 5,290,592 A | 3/1994 | Izuchi et al. |
| 5,571,638 A | 11/1996 | Satoh et al. |
| 7,442,358 B2 | 10/2008 | Sano et al. |
| 9,691,556 B2 | 6/2017 | Cheng et al. |
| 2005/0079119 A1 | 4/2005 | Kawakami et al. |
| 2006/0062713 A1 | 3/2006 | Sano et al. |
| 2006/0062715 A1 | 3/2006 | Endo et al. |
| 2006/0121279 A1 | 6/2006 | Petrik |
| 2007/0092432 A1 | 4/2007 | Prud'Homme et al. |
| 2009/0059474 A1 | 3/2009 | Zhamu et al. |

(Continued)

FOREIGN PATENT DOCUMENTS

| | | |
|---|---|---|
| CN | 1715899 A | 4/2006 |
| CN | 101763944 A | 6/2010 |

(Continued)

OTHER PUBLICATIONS

Zhang et al., ACS Appl. Mater. Interfaces, 2016, 8, 8652-8661 (Year: 2016).*

(Continued)

*Primary Examiner* — Gurpreet Kaur
(74) *Attorney, Agent, or Firm* — Armstrong Teasdale LLP

(57) ABSTRACT

Methods, electrodes, and electrochemical devices using surface-modified pseudo-graphite are disclosed. In one illustrative embodiment, a method may include depositing a pseudo-graphite material onto a surface of an electrode substrate to produce a pseudo-graphite material surface. The method may also include modifying the pseudo-graphite material surface to alter electrochemical characteristics of the electrode.

6 Claims, 3 Drawing Sheets

(56) References Cited

U.S. PATENT DOCUMENTS

| | | |
|---|---|---|
| 2009/0068471 A1 | 3/2009 | Choi et al. |
| 2009/0155561 A1 | 6/2009 | Choi et al. |
| 2012/0228555 A1 | 9/2012 | Cheng et al. |
| 2012/0304743 A1 | 12/2012 | Rajasekharan |
| 2014/0001047 A1 | 1/2014 | Kahn et al. |
| 2014/0111906 A1 | 4/2014 | Eilertsen |
| 2015/0377824 A1* | 12/2015 | Ruhl ............... G01N 27/127 204/424 |
| 2016/0351967 A1 | 12/2016 | Kako et al. |
| 2017/0008825 A1 | 1/2017 | Johnson et al. |
| 2017/0077557 A1 | 3/2017 | Zheng et al. |
| 2017/0169959 A1 | 6/2017 | Cheng et al. |
| 2018/0224390 A1 | 8/2018 | Pan et al. |
| 2018/0362349 A1 | 12/2018 | Zhong et al. |
| 2019/0041356 A1 | 2/2019 | Pan et al. |
| 2019/0079043 A1 | 3/2019 | Johnson, Jr. et al. |
| 2020/0284747 A1 | 9/2020 | Nicholas et al. |
| 2020/0284748 A1 | 9/2020 | Nicholas et al. |
| 2020/0284749 A1 | 9/2020 | Nicholas et al. |
| 2020/0284750 A1 | 9/2020 | Nicholas et al. |
| 2020/0284751 A1 | 9/2020 | Nicholas et al. |
| 2020/0284755 A1 | 9/2020 | Nicholas et al. |

FOREIGN PATENT DOCUMENTS

| | | |
|---|---|---|
| CN | 107017270 A | 8/2017 |
| EP | 0165047 A2 | 12/1985 |
| JP | 2009093819 A | 4/2009 |
| JP | 2017027919 A | 2/2017 |
| KR | 20100118808 A | 11/2010 |
| KR | 1020110069458 A | 6/2011 |
| RU | 2163375 C2 | 2/2001 |
| WO | 1998/020331 A1 | 1/1998 |
| WO | 2001/064938 A2 | 9/2001 |
| WO | 2002/082069 A1 | 10/2002 |
| WO | 2014116026 A1 | 7/2014 |
| WO | 2018181802 A1 | 10/2018 |

OTHER PUBLICATIONS

Poh et al., Chem. Eur. J. 2015, 8130-8136 (Year: 2015).*
Zhang et al., Carbon 2016, 1022-1027 (Year: 2016).*
Singh et al., Electrochimica Acta 2017, 1435-1444 (Year: 2017).*
Jankovsky et al. Nanoscale, 2014, 6065-74 (Year: 2014).*
Ashleigh Anderson et al., "Investigating the Use of Endogenous Quinoid Moieties on Carbon Fibre as Means of Developing Micro pH Sensors," Materials Science and Engineering C, 2014, 533-537, 2014.
ISA/RU, International Search Report and Written Opinion for Related PCT International Patent Application No. PCT/US2020/021130, dated Jun. 18, 2020, 8 pages.
ISA/RU, International Search Report and Written Opinion for Related PCT International Patent Application No. PCT/US2020/021137, dated Jun. 18, 2020, 8 pages.
ISA/RU, International Search Report and Written Opinion for Related PCT International Patent Application No. PCT/US2020/021145, dated Jun. 18, 2020, 8 pages.
ISA/RU, International Search Report and Written Opinion for Related PCT International Patent Application No. PCT/US2020/021149, dated Jun. 11, 2020, 6 pages.
Humayun Kabir et al., "The sp2-sp3 carbon hybridization content of nanocrystalline graphite from pyrolyzed vegetable oil, comparison of electrochemistry and physical properties with other carbon forms and allotropes," Carbon, vol. 144, Apr. 2019, pp. 831-840.
Isaiah O. Gyan et al., "Supporting Information: A Study of the Electrochemical Properties of a New Graphitic Material: GUITAR," ChemElectroChem, 2015, 12 pages.
Isaiah O. Gyan et al., "Electrochemical Study of Biologically Relevant Molecules at Electrodes Constructed from GUITAR, a New Carbon Allotrope," Microchemical Journal, vol. 122, pp. 39-44, Apr. 8, 2015.
Minhua Shao et al., "Recent Advances in Electrocatalysts for Oxygen Reduction Reaction," Chemical Reviews, vol. 116(6), Feb. 17, 2016, pp. 3594-3657.
Andrew A. Gewirth et al., "Nonprecious Metal Catalysts for Oxygen Reduction in Heterogeneous Aqueous Systems," Chemical Reviews, vol. 118(5), Jan. 31, 2018, pp. 2313-2339.
Subal Dey et al., "Molecular electrocatalysts for the oxygen reduction reaction," Nature Reviews Chemistry, vol. 1(98), Dec. 6, 2017, pp. 1-20.
Olga Naumov et al., "The stability limits of highly active nitrogen doped carbon ORR nano-catalysts: a mechanistic study of degradation reactions," Nanoscale, vol. 10(14), Mar. 1, 2018, pp. 6724-6733.
Yanguang Li et al., "Metal-Air Batteries: Will They Be the Future Electrochemical Energy Storage Device of Choice?," ACS Energy Letters, vol. 2(6), May 5, 2017, pp. 1370-1377.
Bin Xu et al., "Modification of vertically aligned carbon nanotubes with $RuO_2$ for a solid-state pH sensor," Electrochimica Acta, vol. 55(8), Mar. 1, 2010, pp. 2859-2864.
Tong-Shen Liu et al., "Au—Fe(III) nanoparticle modified glassy carbon electrode for electrochemical nitrite sensor," Journal of Electroanalytical Chemistry, vol. 632(1-2) Jul. 1, 2019, pp. 197-200.
Kristin R. Kneten et al., "Effects of Redox System Structure on Electron-Transfer Kinetics at Ordered Graphite and Glassy Carbon Electrodes," Analytical Chemistry, vol. 64(21), Nov. 1, 1992, pp. 2518-2524.
Claudia C. Villarreal et al., "Carbon allotropes as sensors for environmental monitoring," Current Opinion in Electrochemistry, vol. 3(1), Jun. 2017, pp. 106-113.
Kevin W. Hathcock et al., "Incipient Electrochemical Oxidation of Highly Oriented Pyrolytic Graphite: Correlation between Surface Blistering and Electrolyte Anion Intercalation," Analytical Chemistry, vol. 67(13), Jul. 1, 1995, 2201-2206.
Paul K. Chu et al., "Characterization of amorphous and nanocrystalline carbon films," Materials Chemistry and Physics, vol. 96(2-3), Apr. 10, 2006, pp. 253-277.
Isaiah O. Gyan et al., "A Study of the Electrochemical Properties of a New Graphitic Material: GUITAR," ChemElectroChem, vol. 2(5), Feb. 12, 2015, pp. 700-706.
Zhen Yuan Xia et al., "Synergic Exfoliation of Graphene with Organic Molecules and Inorganic Ions for the Electrochemical Production of Flexible Electrodes," ChemPlusChem, vol. 79(3), Jan. 29, 2014, pp. 439-446.
"Carbon Nanotube | Purity | Evaluation of Purity and Heat Resistance," Schmadzu, online at https://www.shimadzu.com/an/industry/ceramicsmetalsmining/0102005.html, downloaded Oct. 10, 2019, 4 pages.
B. Rösner et al., "Dispersion and characterization of arc discharge single-walled carbon nanotubes—towards conducting transparent films," Nanoscale, vol. 6(7), Jan. 14, 2014, pp. 3695-3703.
So Yeun Kim et al., "Facile Synthesis of Carbon-Coated Silicon/Graphite Spherical Composites for High-Performance Lithium-Ion Batteries," ACS Applied Materials & Interfaces, vol. 8(19), Apr. 26, 2016, pp. 12109-12117.
Konstantinos Spyrou et al., "A novel route towards high quality fullerene-pillared graphene," Carbon, vol. 61, Sep. 2013, pp. 313-320.
Jarmila Vilčáková et al., "Effect of Surfactants and Manufacturing Methods on the Electrical and Thermal Conductivity of Carbon Nanotube/Silicone Composites," Molecules, vol. 17(11), Nov. 5, 2012, pp. 13157-13174.
Shuai Chen et al., "Branched CNT@$SnO_2$ nanorods@carbon hierarchical heterostructures for lithium ion batteries with high reversibility and rate capability," Journal of Materials Chemistry A, vol. 2(37), Jul. 22, 2014, pp. 15582-15589.
Franco Cataldo, "A Study On the Thermal Stability to 1000° C of Various Carbon Allotropes and Carbonaceous Matter Both Under Nitrogen and in Air," Fullerenes, Nanotubes and Carbon Nanostructures, vol. 10(4), Dec. 2002, pp. 293-311.
Xin Li et al., "Fabrication of ZnO nanowires array with nanodiamond as reductant," RSC Advances, vol. 6(99), Sep. 27, 2016, pp. 96479-96483.

(56) References Cited

OTHER PUBLICATIONS

Reeti Bajpai et al., "Rapid growth of onion-like carbon nanospheres in a microwave oven," CrystEngComm, Nov. 13, 2015, vol. 18(2), pp. 230-239.
R.I.R. Blyth et al., "XPS studies of graphite electrode materials for lithium ion batteries," Applied Surface Science, Oct. 16, 2000, vol. 167(1-2), pp. 99-106.
Jessica Campos-Delgado et al., "Bulk Production of a New Form of sp2 Carbon: Crystalline Graphene Nanoribbons," Nano Letters, Aug. 14, 2008, vol. 8(9), pp. 2773-2778.
Frank Cheng, "GUITAR: A New Material For Dimensionally Stable Anodes," Seminar Given To Washington State University Department of Civil and Environmental Engineering, May 2012, published online at https://www.webpages.uidaho.edu/ifcheng/recent_seminars_and_presentation.htm, 96 pages.
Frank Cheng et al., "GUITAR: A New Material For Dimensionally Stable Anodes," Paper No. 19649, 244th American Chemical Society National Meeting, Philadelphia, PA, Aug. 2012, published online at https://www.webpages.uidaho.edu/ifcheng/recent_seminars_and_presentation.htm, 69 pages.
I. Francis Cheng et al., "Highest measured anodic stability in aqueous solutions: graphenic electrodes from the thermolyzed asphalt reaction," RSC Advances, Feb. 21, 2013, vol. 3(7), pp. 2379-2384.
I. Francis Cheng et al., "Synthesis of graphene paper from pyrolyzed asphalt," Carbon, Jul. 2011, vol. 49(8), pp. 2852-2861.
Henriette Estrade-Szwarckopf, "XPS photoemission in carbonaceous materials: A "defect" peak beside the graphitic asymmetric peak," Carbon, Dec. 2004, vol. 42(8-9), pp. 1713-1721.
Yuqun Xie et al., "Sulfur as an important co-factor in the formation of multilayer graphene in the thermolyzed asphalt reaction," Journal of Materials Chemistry, Mar. 28, 2012, vol. 22(12), pp. 5723-5729.
Tomei et al., "Carbon black-based disposable sensor for an on-site detection of free chlorine in swimming pool water", Talanta, 189, 2018, 262-267. (Year: 2018).
Chen et al., "Preparation of polystyrene/graphite nanosheet composite", Polymer, vol. 44, p. 1781-1784, 2003.
Galdino et al. "Graphite Screen-Printed Electrodes Applied for the Accurate and Reagentless Sensing of pH," Analytical Chemistry, 87, 23, p. 11666-11672, 2015.
Georgakilas et al. "Noncovalent Functionalization of Graphene and Graphene Oxide for Energy Materials, Biosensing, Catalytic, and Biomedical Applications," Chemical Reviews, 116, 9, p. 5464-5519, 2016.

\* cited by examiner

TECHNOLOGIES USING SURFACE-MODIFIED PSEUDO-GRAPHITE

This application is related to U.S. patent application Ser. No. 16/292,317 (titled "Chemical Oxygen Demand Sensing Using Pseudo-Graphite"), Ser. No. 16/292,318 (titled "Chlorine Species Sensing Using Pseudo-Graphite"), Ser. No. 16/292,320 (titled "pH Sensing Using Pseudo-Graphite"), Ser. No. 16/292,322 (titled "Technologies Using Pseudo-Graphite Composites"), and Ser. No. 16/292,323 (titled "Technologies Using Nitrogen-Functionalized Pseudo-Graphite"), all of which were filed on Mar. 5, 2019, by the co-applicants of the present application. The disclosures of the foregoing patent applications are all incorporated herein by reference in their entirety.

BACKGROUND

The present disclosure relates to technologies using surface-modified pseudo-graphite, and more particularly to the utilization of electrodes with surface-modified pseudo-graphite for performing electrochemical operations such as for detecting chemical species.

Generally, some electrodes in a sensor are capable of detecting chemical species, for example, chemical species in a liquid. The electrodes may be utilized to detect a concentration of chemical species in the liquid by applying a potential across the electrode and measuring a resultant signal. However, most chemical detection electrodes have a high cost and may produce a low performance. Additionally, the electrode performance may be reduced due to fouling of the electrode or environmental interferences.

SUMMARY

The present disclosure includes one or more of the features recited in the appended claims and/or the following features which, alone or in any combination, may comprise patentable subject matter.

According to an aspect of the disclosed embodiments, a method of fabricating an electrode may include depositing a pseudo-graphite material onto a surface of an electrode substrate to produce a pseudo-graphite material surface. The method may also include modifying the pseudo-graphite material surface to alter electrochemical characteristics of the electrode.

In some embodiments altering electrochemical characteristics of the electrode may include altering a sensing property of the electrode. Modifying the pseudo-graphite material surface may include depositing nano-particles on the pseudo-graphite material surface. Depositing nano-particles on the pseudo-graphite material surface may include direct electroreduction of gold salts on the pseudo-graphite material surface. Depositing nano-particles on the pseudo-graphite material surface may include depositing the nano-particles through electrochemical in-situ formation. The method may also include following the electrochemical in-situ formation with chemical transformation. The chemical transformation may include electrodeposition of a metal on the pseudo-graphite material, and oxidation of the metal to a metal oxide. Depositing nano-particles on the pseudo-graphite material may include depositing the nano-particles through electrophoretic deposition of pre-made nano-particles. Depositing nano-particles on the pseudo-graphite material may include depositing the nano-particles through at least one of vacuum deposition, photodeposition, an electrospray process, dip-coating, and chemical vapor deposition. Optionally, the step of modifying the pseudo-graphite material surface to alter electrochemical characteristics of the electrode is performed before depositing the pseudo-graphite material onto the surface of an electrode substrate to produce the pseudo-graphite material surface.

Alternatively or additionally, modifying the pseudo-graphite material surface may include binding amine groups to the pseudo-graphite material surface. Binding amine groups to the pseudo-graphite material surface may include Kolbe electro-oxidation of carbamate groups to produce amine radicals. The method may also include grafting the amine radicals to the pseudo-graphite material surface.

It may be desired that modifying the pseudo-graphite material surface may include attaching oxygen-based chemicals to the pseudo-graphite material surface. Attaching oxygen-based chemicals to the pseudo-graphite material surface may include attaching the oxygen-based chemicals through in-situ oxidation. Attaching oxygen-based chemicals to the pseudo-graphite material surface may include applying an oxidizing electrical potential to the pseudo-graphite material surface. Attaching oxygen-based chemicals to the pseudo-graphite material surface may include utilizing a bulk-chemical oxidation process.

In some embodiments, modifying the pseudo-graphite material surface may include coating the pseudo-graphite material surface with tin-oxide. Modifying the pseudo-graphite material surface may include grafting the pseudo-graphite material surface with carbon-centered radicals. Modifying the pseudo-graphite material surface may include halogenating the pseudo-graphite material surface. Modifying the pseudo-graphite material surface may include forming a plurality of electrode traces from the pseudo-graphite material. Forming a plurality of electrode traces from the pseudo-graphite material may include forming stable depositions of the pseudo-graphite material in predetermined areas.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. The detailed description particularly refers to the accompanying figures in which.

DETAILED DESCRIPTION OF THE DRAWINGS

Figure 1:
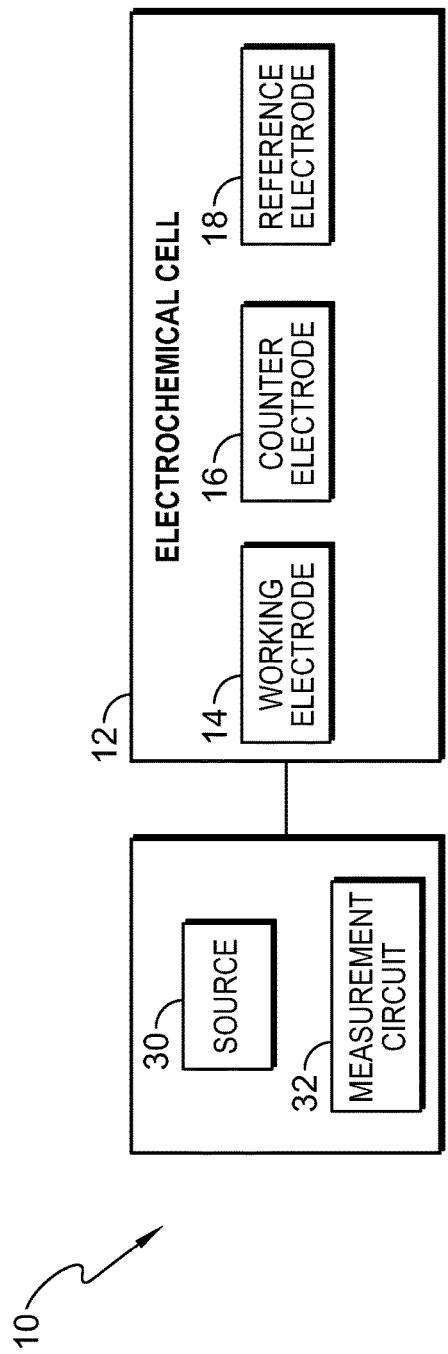
FIG. 1 is a schematic view of a sensor device in accordance with an embodiment.

While the concepts of the present disclosure are susceptible to various modifications and alternative forms, specific embodiments thereof have been shown by way of example in the figures and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring to FIG. 1, in one illustrative embodiment, a sensor device 10 includes an electrochemical cell 12 configured to be positioned within a liquid having a chemical species. The electrochemical cell 12 houses a working electrode 14, a counter electrode 16, and a reference electrode 18. In some embodiments, the electrochemical cell 12 only houses the working electrode 14 and the counter electrode 16, and does not include a reference electrode 18. In other embodiments, the reference electrode 18 and working electrode 14 may be combined into a single electrode. The working electrode 14 is electrically coupled to a source 30. The source 30 may be a current source or a voltage source. Each electrode 14, 16, 18 is coupled to a measuring circuit 32 that is configured to measure current or voltage, depending on the type of source 30.

In an embodiment where the source 30 is a current source, the source 30 applies a known current to the working electrode 14. The measuring circuit 32 detects a resultant current between the working electrode 14 and the counter electrode 16. By comparing the resultant current to a current at the reference electrode 18, a concentration of chemical species in the liquid may be detected.

In an embodiment where the source 30 is a voltage source, the source 30 applies a known voltage to the working electrode 14 that is held at a controlled potential relative to a reference. The measuring circuit 32 detects a resultant voltage or current between the working electrode 14 and the counter electrode 16. By comparing the resultant voltage to a voltage at the reference electrode 18, a concentration of chemical species in the liquid may be detected.

Figure 2:
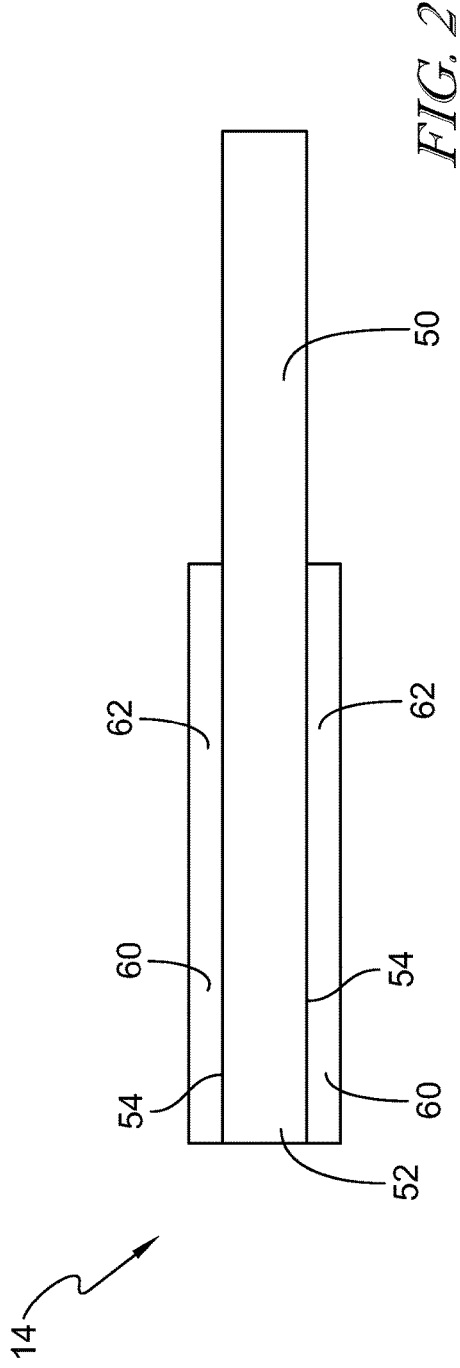
FIG. 2 is a cross-sectional view of the working electrode shown in FIG. 1.

Referring now to FIG. 2, in one illustrative embodiment, the working electrode 14 includes a substrate 50 having at least one surface 52 with a coatable surface 54. In some embodiments, the electrode 14 is a composite electrode. The coatable surface 54 may be selected from at least one of nanosprings, nanotubes, diatomites, a metal, glass, mica, germanium, and silicon. The metal may be selected from copper or iron. The coatable surface 54 may be selected from at least one of nanosprings, nanotubes, diatomites, a metal, glass, mica, germanium, and silicon (including porous high surface area electrochemically etched silicon). The metal may be selected from copper or iron. The coatable surface 54 may possess suitable thermal stability, chemical stability at fabrications temperatures and surface chemistry to have a pseudo-graphite applied thereon. The coatable surface 54 may also have relatively low thermal expansion between the deposition conditions and room temperature. For synthesis/fabrication purposes this includes stable ceramics such as $SiO_2$ (which includes micro- and nano-sized structures such as nanosprings and diatomites), as well as other ceramics like $Al_2O_3$ (including halloysite and anodized aluminum oxide membranes), MgO, iron oxides, silicon, cenospheres, and the like. It also includes suitable carbons such as graphite fibers and carbon black and some high temperature tolerant metals such as tungsten and molybdenum. A pseudo-graphite 54 is coated onto the surface 52 of the substrate 50. The illustrative embodiment shows the pseudo-graphite 54 coated on two surfaces 52 of the substrate 50. In some embodiments, the pseudo-graphite is only coated on a single surface 52 of the substrate 50. In some embodiments, the pseudo-graphite 54 is coated around the substrate 50. The pseudo-graphite 54 may be modified with an electrochemically sensitive material 62 to alter a sensing property of the electrode 14 to enhance the electrode 14 for chemical species detection.

As used in the present disclosure, "pseudo-graphite" refers to an allotrope of carbon that is graphite-like, but that has one or more improved properties as compared to graphite and to graphene. These improved properties may include fast heterogeneous electron transfer (HET) at a basal plane of the pseudo-graphite and/or corrosion resistance greater than graphite and graphene. In some embodiments, the pseudo-graphite may be a nanocrystalline-graphite that is in Stage-2 of Ferrari's amorphization trajectory between amorphous carbon and graphite. In some embodiments, the pseudo-graphite has a nanocrystallite size of 1.5 nm, as measured by X-Ray Diffraction (XRD). The pseudo-graphite may have a layered morphology but, in contrast to graphites and graphenes, has a resistance to monolayer exfoliation. Instead, pseudo-graphite typically exfoliates in thick films of several hundred monolayers at a time. In some embodiments, pseudo-graphite also includes nitrogen-doped pseudo-graphite.

In some embodiments, the pseudo-graphite may have a sp2/sp3 carbon ratio of about 85/15. In other embodiments, the carbon content of the pseudo-graphite may include between 80-90% sp2 carbon and 10-20% sp3 carbon. In still other embodiments, the carbon content of the pseudo-graphite may include between 75-95% sp2 carbon and 5-25% sp3 carbon. By contrast, typical graphites and graphenes both are near 100% sp2 carbon. For clarity, the pseudo-graphite can contain additional elements besides carbon. For instance, some pseudo-graphites include about 11 atomic % hydrogen.

The appearance of pseudo-graphite may be similar to a crystalline graphite but differs in that both the basal and edge planes (EP) have facile heterogeneous electron transfer (HET) kinetics. The basal plane (BP) of graphites have a barrier to HET as these materials are zero-band gap semi-conductors. On the other hand, structural defects within the molecular planes of BP pseudo-graphite may increase density of electronic states (DOS) near the Fermi-level with corresponding HET rates. With the $Fe(CN)_6^{3-/4-}$ redox probe, BP and EP pseudo-graphite have achieved a standard HET rate ($k^0$) of $10^{-2}$ cm/s. Other distinguishing features can include slow hydrogen evolution kinetics and/or molecular planes that are impervious to sub-surface electrolyte intercalation, making the pseudo-graphite more resistant to corrosion than graphites and graphenes. These features can provide a wide electrochemical potential window of 3 V at 200 µA/cm² in 1 M $H_2SO_4$, which surpasses other sp2 carbon electrodes by 1 V and provides pseudo-graphite similar properties to boron-doped diamond.

Illustrative examples of "pseudo-graphite," and methods of producing such materials, are disclosed in each of U.S. Pat. No. 9,691,556, U.S. Patent Application Publication No. 2012/0228555, and Humayun Kabir et al., "The sp2-sp3 carbon hybridization content of nanocrystalline graphite from pyrolyzed vegetable oil, comparison of electrochemistry and physical properties with other carbon forms and allotropes," published in Carbon, volume 144, pages 831-840. The entire disclosures of each of the foregoing references are incorporated herein by reference.

While the pseudo-graphite 54 itself possesses many advantageous electrochemical properties, modifying the pseudo-graphite 54 with other chemical groups may improve the range of functionality and efficacy of the pseudo-graphite 54 for various applications. Such functionalization can provide improved electrode characteristics for a variety of applications. One such type of application is the sensing of various chemical species.

There are several methods for depositing nanoparticles onto the pseudo-graphite material. For example, the nanoparticles may be deposited through electrochemical in-situ formation. The nanoparticles may be deposited through electrochemical in-situ formation followed by additional chemical transformation, for example, electrodeposition of a metal followed by oxidation to a metal oxide. The nanoparticles may be deposited through electrophoretic deposition of pre-made nanoparticles. The nanoparticles may be deposited through vacuum deposition, for example, thermal evaporation, sputtering, etc. The nanoparticles may be deposited through photodeposition. The nanoparticles may be deposited through electrospray. The nanoparticles may be deposited through Langmuir-Blodgett/dip-coating. Additionally, the nanoparticles may be deposited through chemical vapor deposition.

In some embodiments it may be advantageous to deposit nanoparticles through electrochemical and/or electrophoretic methods. This enables the deposition step to be carried out under relatively low-cost conditions and in conjunction with other electrochemical treatments, which may be applied to the electrode. Furthermore, such electrochemical/electrophoretic deposition treatments can be applied via as a selective addressable process where one or more electrodes on a multi-electrode chip can be deposited with nanoparticles while not depositing particles onto the other electrodes. That is, a multi-electrode chip can be immersed into a liquid bath and a potential can be applied between one or more electrodes on the working electrodes and a counter electrode also in contact with the liquid to drive deposition of nanoparticles onto the working electrodes without depositing nanoparticles onto other electrodes on the multi-chip cell. This process can be iteratively applied by then putting the multi-electrode chip into another liquid bath and applying a potential to one or more electrodes to functionalize this set of electrodes in some other way. In some embodiments, a biasing electrical potential may be simultaneously applied to the electrodes which are not being decorated in some particular step to prevent unwanted decoration of these electrodes. This creates addressable decoration of various nanoparticles onto specified electrodes.

In some embodiments, this pseudo-graphite material electrode may be pre-treated prior to electrodeposition of nanoparticles, for example gold nanoparticles. Illustrative pretreatment methods include anodic oxidation.

Figure 3:
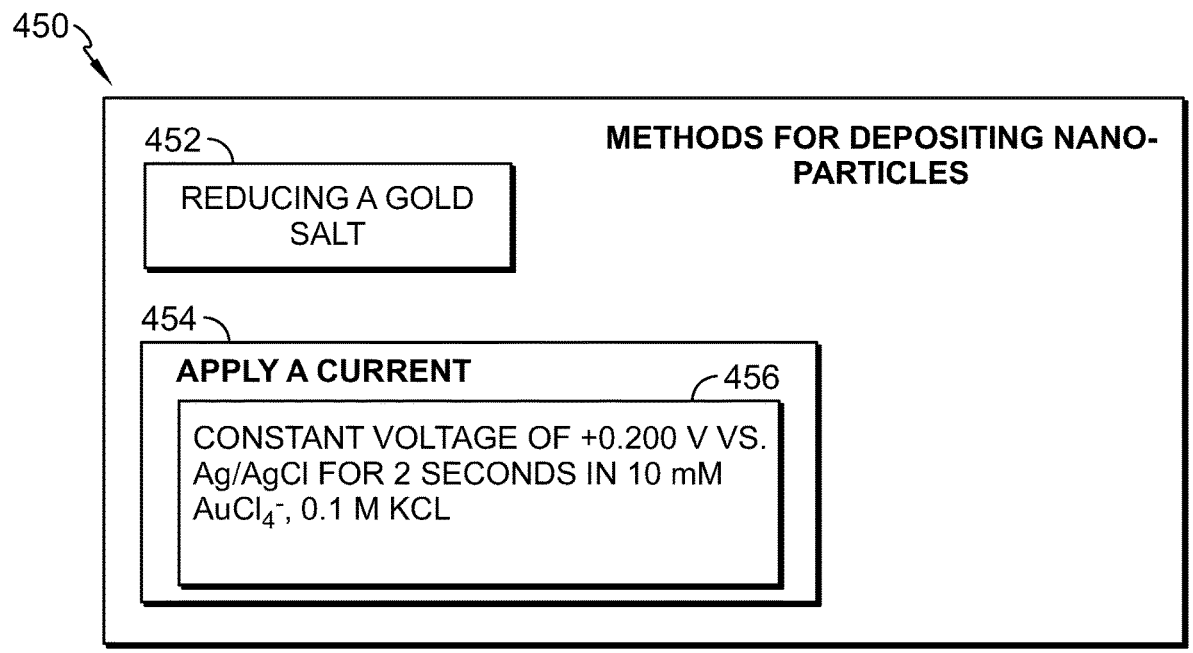
FIG. 3 is a flowchart of a method for electrochemically depositing metal nanoparticles by methods such as in-situ reduction of metal salts.

FIG. 3 illustrates methods 450 for electrochemically depositing metal nanoparticles by methods such as in-situ reduction of metal salts. For example, gold nanoparticles can be deposited by reducing a gold salt at a pseudo-graphite material electrode from an aqueous solution, 452. In some embodiments, the gold salt is $HAuCl_4$. Other metal salts include $RuCl_3 \cdot xH_2O$, $AgNO_3$ (including ammoniacal solutions thereof), $PdCl_2$, $H_2PdCl_4$, $CoSO_4$, $H_2PtCl_6$. The metal salts can be present at a particular concentration. Exemplary concentrations include at least 2 mM or at least 5 mM. In some embodiments, the metal salt is present at about 10 mM. In some embodiments, combinations of metal salts may be used to produce metal nanoparticles comprised of multiple metal species.

In some embodiments, the electrodeposition of such nanoparticles may be achieved by applying a relatively large current for a relatively short time to produce large numbers of nanoparticles across the surface of the pseudo-graphite material electrode, 454. Illustratively, a voltage of +0.200 V vs. Ag/AgCl can be applied for a set amount of time. In some embodiments, the voltage is applied for at least 1 second or at least 2 seconds. One embodiment of conditions for applying gold nanoparticles to the pseudo-graphite material electrode is the application of a constant voltage of +0.200 V vs. Ag/AgCl for 2 seconds in 10 mM $AuCl_4^-$, 0.1 M KCl.

In some embodiments, nanoparticles may be deposited in the presence of one or more capping agents to provide protective surface groups. Ilustrative capping agents include thiols and silanes, such as thiols-on-metal and chlorosilanes-on-oxides.

In some embodiments, the depositing conditions may be utilized to tune nanoparticle properties such as the size of the nanoparticles. For example, the nanoparticles may have a size within a range of 1-100 nm. Since the specific properties of nanoparticles often depends on properties such as size (due to effects such as quantum confinement, and surface-to-volume, and lattice formation effects). For mixed valence cerium oxide nanoparticles this can be utilized to tune the effective redox potential. For example, the redox potential can be tuned by more than 1V from the bulk down to nanoparticles of approximately 10-20 nm in diameter.

The electrode 14 enables expanded and tuned electrochemical operations based on nanoparticle/pseudo-graphite material composites. One type of application is for electrochemical sensing applications. Such applications may include chemical oxygen demand (COD) sensing, hypochlorite sensing, pH sensing, $H_2O_2$ sensing, nitrite sensing, and hydrazine sensing.

Figure 4:
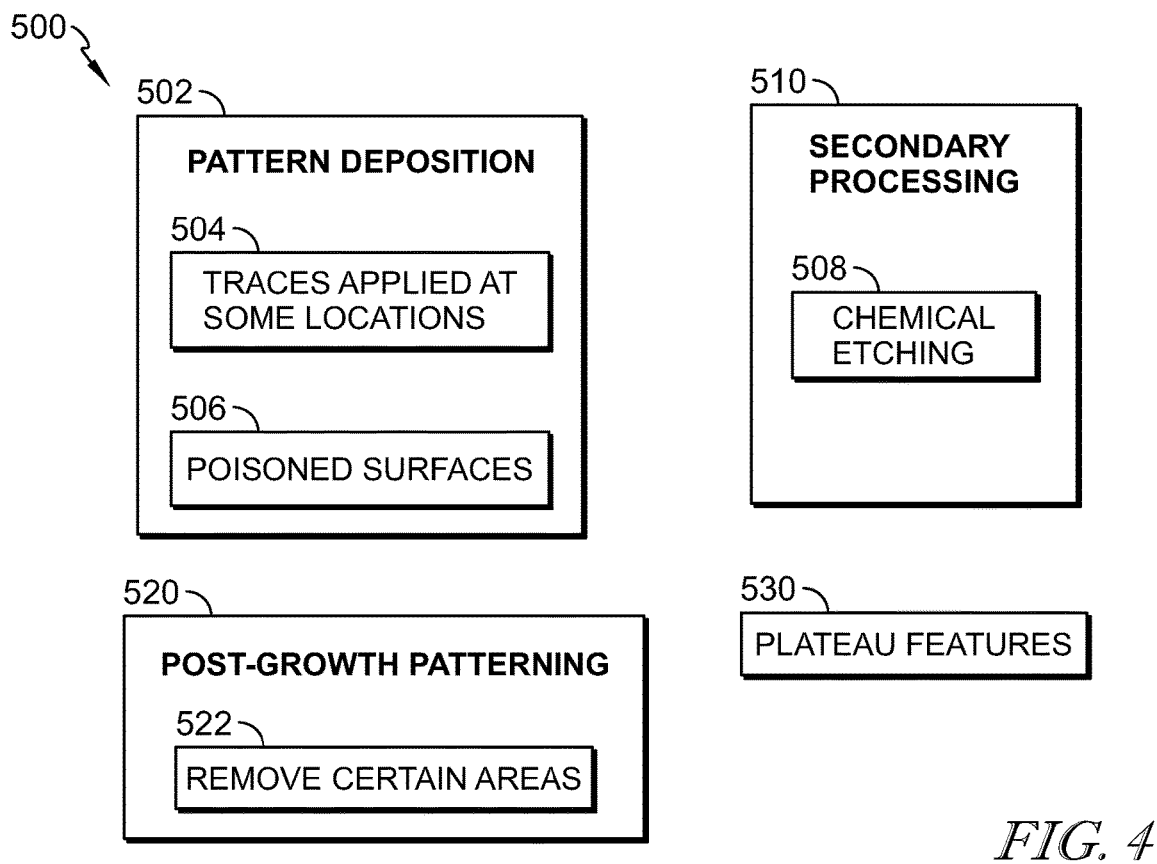
FIG. 4 is a flowchart of a method for forming electrode traces upon the pseudo-graphite material surface for the purposes of performing electrochemical sensing methods.

FIG. 4 illustrates a method 500 for forming electrode traces from the pseudo-graphite material surface for the purposes of performing electrochemical sensing methods. Optionally the traces may be constructed to have differentiated physico-chemical characteristics which provide differentiated electrochemical behaviors to enable differentiated operation of the various traces for the purposes of performing electrochemical sensing method, for example, for selectivity, sensitivity, stability, etc.

The method 500 may include forming a plurality of pseudo-graphite material traces onto a single contiguous physical body, for example, onto a single surface of a physically contiguous body. For instance, this may be accomplished by forming a plurality of pseudo-graphite material traces onto a single surface of a quartz slide or a glazed porcelain tile. Typically, these traces are formed in such a geometry as to have portions of them that are exposed to the electrochemical solution (the active area) and other portions of them that are not in direct contact with the electrochemical solution and provide space for forming electrical contacts to a larger device. In some embodiments, the traces may be formed from another material. The pseudo-graphite may then be placed on a portion of the trace to form the electrode.

At block 502, patterned deposition is utilized to form the traces. Traces may be formed directly onto a surface wherein the surface is pre-constructed in such a way to selectively form stable depositions of pseudo-graphite material in some areas (thus forming traces) and not in others, at block 504. This may be achieved through the use of surfaces which have areas that act to poison the deposition of pseudo-graphite material, such as certain metals (e.g., Ca) and certain halide salts (e.g., $SrCl_2$), at block 506. Alternatively, this may be achieved through the use of surfaces which have areas which allow the deposition of pseudo-graphite material but which may be selectively removed by secondary processing, 510, such as chemical etching (e.g., MgO with acid etch removal), at block 508. Thus, if the surfaces are patterned atop a surface onto which pseudo-graphite material may be grown (e.g. quartz) these patterned surface features provide area which are bare of pseudo-graphite material in the end and the rest of the surface provides the areas to which the pseudo-graphite material is affixed to provide the pseudo-graphite material traces.

At block 520, post-growth patterning is utilized to form the traces. Traces may be formed after non-selective growth of pseudo-graphite material onto a part/surface by selectively removing certain areas of the pseudo-graphite material while leaving other areas intact, at block 522. Specifically, pseudo-graphite material can be removed by methods such as mechanical abrasion, for example by a rotary sander, laser thermal etching, spark discharge etching, etc.

In some embodiments, the traces may be formed on one surface and then transferred to another surface for use. For example, a plurality of traces may be formed on a patterned silicon substrate wherein some portions of the silicon are substantially raised relative to other portions of the substrate to form "plateau" features, at block 530. The traces may be transferred from said plateau features to another substrate to which the pseudo-graphite material adheres, for example, an adhesive layer such as acetone vapor exposed polystyrene. In some embodiments, the traces may be formed from composite based electrodes.

In some embodiments, the traces may be selectively processed to produce differentiated electrochemical amongst the various traces. This may be accomplished by chemical modification of the pseudo-graphite material surface. The surface chemistry and resultant electrochemical behavior of the pseudo-graphite material may be altered by a variety of methods such as electrochemical oxidation, electrochemical attachment of functional groups, chemical covalent attachment of functional groups, non-covalent association of functional groups, plasma surface modification, for example hydrogenation, etc. Many of these depositions can be driven by application of electrical potentials or irradiation. In these cases the process for selectively modifying the surface chemistry of a subset of the electrodes without modifying the surface chemistry of other electrodes may be conducted through a maskless process which may enable production of such systems with enhanced economic efficiency. Further-more, many of these processes may be conducted in liquid bath environments which may be used to enable the production of such systems with enhanced economic efficiencies. In other cases, masking may be utilized to select where chemistry is performed.

In some embodiment, the traces are formed through the deposition of additional materials onto the pseudo-graphite material surface. The electrochemical behavior of the pseudo-graphite material may be altered by deposition of various additional materials onto the surface of the pseudo-graphite material through a variety of methods such as electrodeposition, electrochemical deposition, chemical vapor deposition, etc. Many of these depositions can be driven by application of electrical potentials or irradiation. In these cases, the process for selectively modifying the electrochemical behaviour of a subset of the electrodes without modifying the electrochemical behavior of other electrodes may be conducted through a maskless process which may enable production of such systems with enhanced economic efficiency. Furthermore, many of these processes may be conducted in a liquid bath which may be used to enable the production of such systems with enhanced economic efficiencies. In other cases, masking may be utilized to select where chemistry is performed.

In some embodiments, the traces are formed from a sequential bath treatment of an array of electrodes on a single chip. In such an embodiment, an array of electrodes, for example four electrodes, is formed. The array is dipped into a first bath to perform an electrochemical oxidation of the first electrode. The array is then dipped into a second bath to perform an electrochemical amination of the second electrode. The array is then dipped into a third bath to perform a gold nanoparticle electrochemical deposition of the third electrode.

The electrode 14 may be used for a variety of applications. For example, the electrode 14 provides for electrochemical sensing in which multiple chemical parameters may be determined simultaneously or in close temporal proximity by the single device system. The electrode 14 may provide improved determination of a single chemical parameter with improved discrimination and compensation versus environmental interferences and influences. The electrode 14 may enable the implementation of multiple electrode traces which may be sequentially exposed over time to produce an overall device with improved stability over time for measurements which are susceptible to fouling, drift, etc.

In some embodiments, such multi-trace devices may be utilized directly to electrochemically sense multiple chemical characteristics of an environment (e.g., pH, chemical oxygen demand, chlorination, etc.). This may be performed in some embodiments by providing for multiple different traces which function as working electrodes for detection of said species, and one or more counter electrodes for said working electrodes and one or more reference electrodes as necessary to conduct said measurements. For instance, an oxidized electrode trace may be used in conjunction with a ferrocene decorated reference electrode trace and a pseudo-graphite material counter electrode trace to measure pH, while a gold-nanoparticle decorated electrode and a pseudo-graphite material counter electrode trace may be used to measure chlorination, and an $SnO_2$ nanoparticle decorated electrode trace and a pseudo-graphite material counter electrode trace may be utilized to measure chemical oxygen demand within a single integrated unit.

In some embodiments, such multi-trace devices may be utilized to measure a single chemical characteristic of interest with other electrodes measuring and/or compensating for other aspects of the chemical environment that could interfere with the measurement of the chemical characteristic of interest. For instance, measurement of chlorination depends upon the pH of the measured solution, which is often handled by introducing a buffer solution to adjust pH to enable accurate measurement. In a multi-trace pseudo-graphite system, a system could use a both a gold-nanoparticle decorated pseudo-graphite material electrode trace and a native pseudo-graphite material electrode trace with a pseudo-graphite material counter electrode to measure chlorination, along with an oxidized pseudo-graphite material electrode and a ferrocene-functionalized pseudo-graphite material reference electrode and a pseudo-graphite material counter electrode to measure pH and a diamond-like-carbon-layer-functionalized pseudo-graphite material electrode to locally modulate the solution pH if necessary which utilized together can produce a high fidelity measurement of chlorine which is both sensitive and has significant ability to discriminate versus potential interferences and signal degradation over time.

In some embodiments, the electrode 14 may be utilized to produce multiple traces of the same which have substantially the same properties which are utilized sequentially to perform sensing operations which are used in cases wherein the electrode is subject to fouling due to the operation of the sensor. The sequential testing regimen may be implemented through various methods such the maintaining the electrodes which are not currently active for sensing at a different potential versus the sensing potential to prevent fouling; or by covering them with a protective material layer and removing the covering to expose them for sensing; or other similar methods. Such multi-electrode constructions with pluralities of substantially the same form of electrode may be utilized for the purpose of using different electrode traces over time for sensing protocols where the electrodes are prone to fouling with use so that a single electrode chip may be used to provide an operational device lifetime which is significantly longer than the operational lifetime of a single trace.

In some embodiments, these methods may be used to fabricate the pseudo-graphite material traces into forms which are well-suited to minimizing diffusion kinetics effects on the sample to improve the sensing operation of the electrodes, for example, in the form of "micro-electrodes".

In some embodiments these methods may be used to fabricate multiple traces of substantially similar electrodes in a range of sizes to enable a larger span of measurement range, for example, for solution conductivity.

Figure 5:
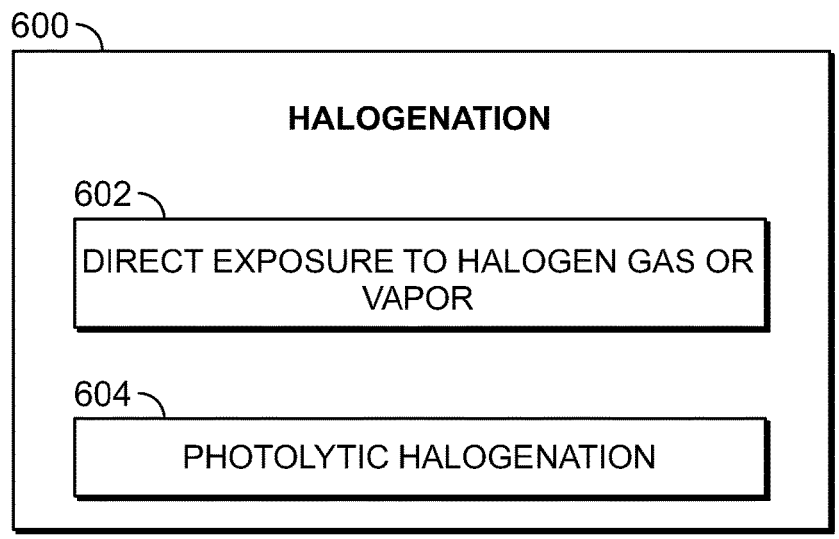
FIG. 5 is a flowchart of a method for halogenation of aromatic-lattice carbon materials.

FIG. 5 illustrates various methods 600 for halogenation of aromatic-lattice carbon materials (including pseudo-graphite material and carbon nanotubes). The pseudo-graphite material follows many of the same general trends but is unique in providing a relatively high density of lattice defects embedded in a globally stabilized lattice. This enables the reactions of pseudo-graphite material and the subsequent enablements provided by the material in a functionalized form to behave in a manner which is differentiated from the behaviors of other carbon materials known in the art. At 602, halogenation is performed through direct exposure to a halogen gas or vapor. This step may be performed under conditions of elevated pressure and/or temperature with the particular conditions depending strongly on the reactivity of the halogen used. For instance, bromination may be accomplished by exposing the pseudo-graphite material to $Br_2$ at a temperature of approximately 200° C. to 250° C. and pressures of approximately 2-10 atm.

At block 604, halogenation is performed through photolytic halogenation by a halogen. For instance, bromination may be accomplished by mixing of pseudo-graphite material flakes and liquid $Br_2$ at −30° C. along with UV/near-UV irradiation. At block 606, halogenation is performed through photolytic halogenation by s halosuccinimide. For instance, bromination may be accomplished by mixing of pseudo-graphite material flakes and liquid N-bromosuccinimide in dichloromethane at approximately 30° C. along with UV and/or visible spectrum irradiation. At block 608, halogenation is performed through redox halogenation by a halogen. For instance, bromination may be accomplished by first rendering the pseudo-graphite material into a strongly reduced state, for example, by reacting pseudo-graphite material flakes with alkali napthalenide in a suitable ethereal solvent or by reacting pseudo-graphite material flakes with alkali metal with graphene in an ethereal solvent and a catalytic amount of naphthalene, then by adding liquid bromine to this suspension containing the reduced pseudo-graphite material. This reaction can be quenched through the addition of oxidants such as $FeBr_3$ to eliminate residual extraneous reactivity.

Such halogenated (e.g., brominated) graphene may be used as a starting point for additional functionalization e.g., by nucleophilic substitution. For instance, alkoxy-linked groups may be produced by mixing the brominated pseudo-graphite material with alcohol containing species (such as ethanol, methoxyethanol, polyethylene glycols, etc.) and allowing to react at between approximately 25° C. and 70° C. Alternatively, hydroxyl groups may be produced by reacting the brominated pseudo-graphite material with water in a solution of non-reactive, polar, aprotic solvent.

Figure 6:
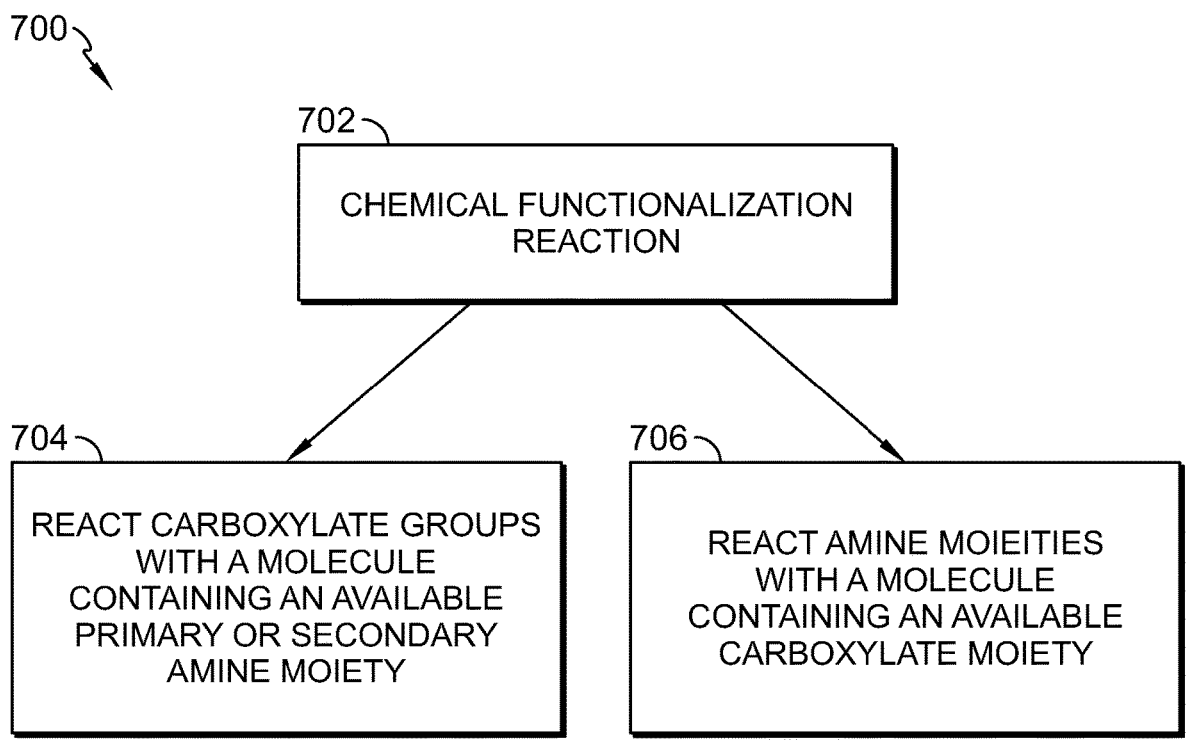
FIG. 6 a flowchart of a method for amide linkage of functional groups to of aromatic-lattice carbon materials.

FIG. 6 illustrates various methods 700 for amide linkage of functional groups to of aromatic-lattice carbon materials (including pseudo-graphite material and carbon nanotubes). The pseudo-graphite material follows many of the same general trends but is unique in providing a relatively high density and relatively homogeneous distribution of lattice defects embedded in a globally stabilized lattice. This enables the reactions of pseudo-graphite material and the subsequent enablements provided by the material in a functionalized form to behave in a manner which is differentiated from the behaviors of other carbon materials known in the art. At block 702, a chemical functionalization reaction is performed on the pseudo-graphite to form a group supporting amidation coupling such as carboxylate moieties or amine moieties. In some embodiments, carboxylate moieties are formed via oxidation of the pseudo-graphite to form oxygen-bearing functional moieities on the pseudo-graphite of which some fraction of these moieities are carboxylate moieties. At block 704, these carboxylate groups are reacted with a molecule containing an available primary or secondary amine moiety to link this molecule to the pseudo-graphite through an amide bond. Commonly this step may be achieved through exposure of the surface to a solution containing the amine-bearing moiety and a peptide coupling agent such as dicyclohexylcarbodiimide or diisopropylcarbodiimide. In some embodiments, amine moieties are formed via amination of the pseudo-graphite to form amine moieties on the pseudo-graphite. At block 706, these amine moieities are reacted with a molecule containing an available carboxylate moiety to link this molecule to the pseudo-graphite through an amide bond. Commonly this step may be achieved through exposure of the surface to a solution containing the carboxylate-bearing moiety and a peptide coupling agent such as dicyclohexylcarbodiimide or diisopropylcarbodiimide. In some embodiments the carboxylate-bearing moiety may contain two available carboxylate and simultaneously accessible moieties which are both reacted to form an imide linkage to the pseudo-graphite.

Native pseudo-graphite material possesses many advantageous electrochemical properties. However, the introduction of other chemical groups onto the surface of pseudo-graphite material may be utilized to improve the range of functionality and efficacy of pseudo-graphite material for various applications. Such chemically functionalized materials can provide improved electrode characteristics for a variety of applications. Such chemical groups may include surface oxidized pseudo-graphite material (quinone-like, phenol-like, lactone-like, etc.), oxidized-and-then-reduced pseudo-graphite material, aminated pseudo-graphite material, carboxylated pseudo-graphite material, methylated/alkylated pseudo-graphite material, phenylated pseudo-graphite material, benzylated pseudo-graphite material, diamond-like functionalized pseudo-graphite material, cyclopropenoid/carbene-oid functionalized pseudo-graphite material and derivatives, ferrocene-ated pseudo-graphite material including ferrocene-ated pseudo-graphite material with secondary protections such as methyl/alkyl protection of pseudo-graphite material surfaces and ferrocene moieties, PEG-ylated pseudo-graphite material, etherification of pseudo-graphite material, unsaturated pendant group binding of pseudo-graphite material, shell-Functionalization of pseudo-graphite material, non-covalent decoration of pseudo-graphite material, and CNT/graphite/graphene functionalization reactions. These surface groups may be formed by a number of methods as determined through direct testing and adaptation of various methods.

In some embodiments, pseudo-graphite material is placed into an environment conducive to oxidation (e.g. sulfuric acid) and an anodizing potential process is applied thereto. Various forms of such anodic potentials may be utilized including constant voltage conditions, constant current conditions, and applied square-waves, ramps, and cycles. The specific conditions applied including chemical environment and oxidizing potentials may be used to tune the type and density of surface functional groups produced.

In some embodiments, oxidized pseudo-graphite material is placed into an environment conducive to reduction and a reducing potential process is applied thereto. Various forms of such reducing potentials may be utilized including constant voltage conditions, constant current conditions, and applied square-waves, ramps, and cycles. Depending upon the conditions used this may be used to produce various products. For instance a relatively low reducing potential applied in a protic solvent will convert quinonic oxygens to hydroquinonic moieties. Application of higher applied reducing potentials and/or different solvent environments can be used to form other groups (e.g. removing the oxygen).

In some embodiments, pseudo-graphite material is placed into a solution containing ammonium carbamate and an oxidizing potential is applied to the pseudo-graphite material to drive a Kolbe-like reaction to remove the carboxylate group from the carbamate and leave behind a primary amine radical which can then covalently attach to the pseudo-graphite material surface. Alternatively, pseudo-graphite material is placed into a solution (e.g. non-aqueous, non-reactive, aprotic e.g. degassed acetonitrile) containing a secondary amine (such as ethylamine) and an oxidizing potential is applied to the pseudo-graphite material to drive dehydrogenation of the amine and formation of the corresponding amino radical which can then covalently attach to the pseudo-graphite material surface. In some embodiments, this can be applied to poly-amines (e.g. polyethylene amine) to create multiply grafted surface species. Alternatively, pseudo-graphite material is placed into a solution (e.g. non-aqueous, non-reactive, aprotic e.g. degassed solutions of acetonitrile, propylene carbonate, sulfolane, etc.) containing an amino acid and an oxidizing potential is applied to the pseudo-graphite material to drive a Kolbe-like reaction to remove the carboxylate group (or groups) to leave behind an aminoalkyl radical which can then covalently attach to the pseudo-graphite material surface.

In some embodiments, pseudo-graphite material is placed into a solution containing a half-ester diacid (e.g. sodium monomethyl ester malonate) and an oxidizing potential is applied to the pseudo-graphite material to drive a Kolbe-like reaction to remove the carboxylate group from the half ester diacid (malonate) and leave behind an (ethanoate ester) radical which can the covalently attach to the pseudo-graphite material surface. Alternatively, other methods such as the Bingel reaction followed by de-esterification can also be utilized to attach carboxylate groups to pseudo-graphite material.

In some embodiments, pseudo-graphite material is placed into a solution (commonly non-aqueous, non-reactive, aprotic e.g. degassed acetonitrile) containing a haloalkane, for example, a monohaloalkane, such as methyl bromide, octyl iodide, chloro-cyclohexane, etc., and a reducing potential is applied such that the halogen is cleaved to produce the corresponding alkane radical which can then covalently attach to the pseudo-graphite material surface.

In some embodiments, pseudo-graphite material is placed into a solution containing benzoyl peroxide which is cleaved by typical methods to form phenyl radicals which then covalently attach to the pseudo-graphite material surface. The cleavage of the benzoyl peroxide may be accomplished by photolysis which enables simple and direct control of the location/s where this functionalization is achieved while not functionalizing other regions if so desired.

In some embodiments, pseudo-graphite material is placed into a solution containing sodium phenylacetate and an oxidizing potential is applied to the pseudo-graphite material to drive a Kolbe-like reaction to remove the carboxylate group from the phenylacetate and leave behind a benzyl radical which can the covalently attach to the pseudo-graphite material surface.

In some me embodiments, pseudo-graphite material may be functionalized using Friedel-Crafts-type chemistries. In some embodiments, pseudo-graphite material is placed into a solution of dichloromethane containing para-benzoquinone and anhydrous $FeCl_3$ and the solution is stirred to drive covalent attachment of the benzoquinone groups to the surface as hydroquinones.

In some embodiments, diamond-like refers to a lattice of substantially sp3 bonded carbon. pseudo-graphite material is placed into a solution (commonly non-aqueous, non-reactive, aprotic e.g. degassed acetonitrile) containing a haloform and a reducing potential is applied such that the halogens are cleaved to produce the corresponding series of alkane radicals which can then covalently attach to the pseudo-graphite material surface and to each other while leaving a hydrogenic termination. This process is substantially self-limiting for producing thin films of decorating functional groups onto the pseudo-graphite material, e.g. approximately one or a few monolayers under suitably chosen conditions. In some cases the haloform may a be a species containing a plurality types of halogens (e.g. $CBrCl_2H$) such that the potentials needed to cleave the different halogens are differentiated to engender greater control over the reaction dynamics and outcomes. In some cases this may also be carried out using 1,1,1 trihaloalkanes which will create behind an alkyl (rather than hydrogen) terminated surface. In some cases this type of a reaction may also be carried out using halogenated ethanes such as 1,1,1tribromo-2,2dichloro-ethane wherein a reducing potential is applied to first selectively dehalogenate one of the carbon atoms (e.g. the 1,1,1 brominated carbon) and thereby produce a series of radicals which graft to the pseudo-graphite material surface and to each other then apply conditions to produce a set of radicals from the other carbon (e.g. applying reducing potentials or alternatively hydroxyl ions to the chlorinated carbon). In some cases tetrahalomethanes (e.g. fluorotribromomethane) may be utilized in this type of reaction wherein a potential profile is applied which cleaves one type of halogen (the bromine) but not the other (the fluorine) to leave a halogen (fluorine) terminated surface.

In some embodiments, pseudo-graphite material is placed into a solution (commonly non-aqueous, non-reactive, aprotic e.g. degassed acetonitrile) containing a methylhalide or a haloform and adding a sufficiently strong basic species (e.g. a saturated aqueous solution of KOH along with a quaternary ammonium species for transport of the hydroxyl into the non-aqueous phase) to convert the methylhalide/haloform species into a carbene radical which can the covalently attach to the pseudo-graphite material surface. In some cases an additional procedure may be performed to alter the attached species which is formed, e.g. when haloform is used it will produce a di-halogenated surface functional group, this group may be altered by the application of a reducing potential to eject the halogen from this surface functional group so that a new group can be formed, e.g. oxygen bearing groups in an aqueous environment, etc. Other chemistries are also known which can produce similar carbene radicals which could alternatively be used to produce such functionalizations. In some embodiments, such halocyclopropenoids may be further modified to produce modified functionalizations. For instance, dihalocyclopropenoid groups may be electro-reduced to then undergo reaction with the proximate solvent system (e.g. solutions containing water, alcohols, alkoxides, hydrogen peroxides, organic peroxides, etc.)

In some embodiments, pseudo-graphite material is placed into a solution (commonly non-aqueous, non-reactive, aprotic e.g. degassed acetonitrile) containing a ferrocene with an attached halogen group (e.g. bromoferrocene, 6-bromohexylferrocene, etc.) and a reducing potential is applied such that the halogen is cleaved to produce the corresponding ferrocenic radicals which can then covalently attach to the pseudo-graphite material surface. This surface may then be further treated through the application of alkylhalide and/or haloform groups as described above. This can be utilized to both modify the electron transfer characteristics of the pseudo-graphite material surface and also to functionalize the ferrocene groups bound to its surface which in turn enhances the stability of such ferrocene species against degradation and can be utilized to enhance the stability of electrodes containing such ferrocene bound layers. Alternatively, pseudo-graphite material is placed into a solution (e.g. acetonitrile) containing a ferrocene with a pendant carboxylate group (such as tetrabutylammonium ferrocene carboxylate, tetrabutylammonium ferrocene acetate, tetrabutylammonium ferroceneheptanoate, etc.) an oxidizing potential is applied to the pseudo-graphite material to drive a Kolbe-like reaction to remove the carboxylate group from the ferrocene and leave behind a radical which can the covalently attach to the pseudo-graphite material surface. Alternatively, pseudo-graphite material or oxidized-then-reduced pseudo-graphite material is placed into a solution containing ferrocene and/or ferrocene-based species and which is, then, ligand exchanged to replace one of the cyclopentadienyl groups with the polycondensed pseudo-graphite material structure through conditions such as are known in the literature (e.g. strongly reducing conditions with $AlCl_3$ in cyclohexane).

In some embodiments, pseudo-graphite material is immersed into an aqueous solution containing PEG and a photocatalyst (e.g. tetrabutylammonium decatungstate) which acts to absorb light and then activate PEG chains via hemolytic C—H cleavage to produce a radical which then covalently attaches to the pseudo-graphite material surface. Alternatively, pseudo-graphite material is immersed into a bath of neat PEG containing a suitable supporting electrolyte (e.g. $LiClO_4$) and a suitable anodic potential is applied (e.g. 1.2V vs. SCE) which generates a reactive PEG species which attaches to the pseudo-graphite material surface.

In some embodiments, pseudo-graphite material is first oxidized to form quinone-like groups and then protically reduced to form hydroquinone-like groups. This is then subject to basic conditions (e.g. KOH in water) to form phenoxide-like groups. This phenoxidated pseudo-graphite material is then placed into a solvent (e.g. acetonitrile) containing an organo-halide (e.g. iodoalkane) which can then undergo Williamson coupling to form the ether linkage.

In some embodiments, unsaturated groups may be bound to pseudo-graphite material by using free-radical generation to bind moieties which can then be converted to unsaturated groups. For instance, a monohalogenated moiety such as 3-Bromopropionic acid or a dihalogenated moiety such as 3,4-dibromobutanoic acid. Kolbe radical generation can then be utilized form this moiety into a radical by removing the carboxylate and thereby link this group to the pseudo-graphite material surface. This group may then be converted back to an unsaturated group by dehydrohalogenation (by a base such as sodium amide) to form either the alkene or an alkyne (respectively). These groups may then be utilized to further functionalize the pseudo-graphite material surface through reaction with these groups by a variety of chemistries such as are known in the art.

In some embodiments, pseudo-graphite material is immersed into an aqueous solution containing SDBS and 1-viny-2-pyrrolidone so that the SDBS forms an adsorbed layer onto the pseudo-graphite material. The VP adsorbs at the SDBS surface. Acid (e.g. HCl) is added to lower the pH and thus create an in-situ polymerized coating onto the pseudo-graphite material surface. The adsorption of the SDBS can be modified by applying a potential to the pseudo-graphite material such that the SDBS is attracted to or repelled from the pseudo-graphite material surface. This effect may further modified by the addition of cationic surfactants. This example is a form of non-covalent functionalization which forms a 'shell' onto the pseudo-graphite surface.

In some embodiments, non-covalent decorations for graphenic carbons are applied to pseudo-graphite material. These include adsorption through pi-stacking of polycondensed aromatic molecules, such as pyrene, coronene, etc., surfactant self-assembled layers, and adsorption of polymers, such as sulfonated polyaniline.

Additionally, various other reactions can be directly adapted to the functionalization of pseudo-graphite material. These include diazonium cleavage functionalization, Billup's functionalization, osmylation, ozonation & ozonized hydroxylation, fluorination, cycloaddition (e.g. ylide, nitrene, Diels-Alder, etc.), nucleophilic (e.g. Hirsh) additions, Friedel-Crafts acylation, etc.

In some embodiments, it may be advantageous to functionalize particular pseudo-graphite material surfaces through methods which enable the functionalization to be selective and addressable in functionalization of some surfaces while leaving other pseudo-graphite material surfaces unfunctionalized. In particular, for systems in which multiple pseudo-graphite material elements exist on a single part, the use of addressable functionalization methods such as optically and/or electrochemically addressable methods can readily enable processes for selective functionalization of one or more pseudo-graphite material elements while not functionalizing one or more other elements. This can be utilized to create devices with multiple differentially functionalized elements to enable multiple device functionalities integrated within a single part. For instance, in some embodiments, a multi-electrode chip can be immersed into a liquid bath and a potential can be applied between one or more electrodes on said chip ('working electrodes') and a counter electrode also in contact with the liquid to create specific surface functionalization onto the working electrode/s without surface functionalizing the other electrodes on the multi-electrode chip. In another example, a multi-electrode chip can be immersed into a liquid bath containing optically activated chemical agents and a selected subset of the electrode areas on the chip a potential can be irradiated with suitable light to create specific surface functionalization onto the selected electrode/s without surface functionalizing the other electrodes on the multi-electrode chip. Such processes can be iteratively applied by then putting the multi-electrode chip into another liquid bath and applying conditions to surface functionalize to one or more electrodes to surface functionalize this set of electrode/s in some other way. In some embodiments, a potential may be simultaneously applied to the electrodes which are not being surface functionalized in some particular step to prevent unwanted surface functionalization of these electrodes. This creates addressable surface functionalization of various moieties onto specified electrodes.

In some embodiments, the specific conditions applied (including e.g. chemical environment, temperature, irradiation, oxidizing potentials etc.) may be used to tune the type and density of surface functional groups produced.

In some cases such surface functionalization may be used to facilitate further modifications of the surface such as the deposition of nanoparticles. For instance, such surface functionalization may be utilized to enhance nucleation, anchoring, stabilization, etc. for nanoparticles deposited on the surface.

The chemistries which are utilized to functionalize the surface do not need to have high yield efficiencies. For instance, Kolbe cleavage radical formation efficiency can be significantly reduced by the presence of certain substituents, especially at the alpha carbon, e.g. through the formation of charged carbenium species. However, as long as the lower yield does not introduce unwanted functional groups onto the pseudo-graphite material electrode nor otherwise interfere with the functionalization chemistry it may be fully acceptable for the reaction efficiency to be very low (even below 1%). That is, since the desired outcome is simply the functionalization of the surface a very small number of successful reactions are required to achieve this versus the bulk phase. This is particularly true for reactions in which the reactive species are generated directly in proximity to the pseudo-graphite material surface (rather than in a bulk-phase of solution).

The pseudo-graphite material may possess useful electrode properties including high corrosion resistance and high heterogeneous electron transfer kinetics. In various embodiments, and chemistries adopted chemical techniques may be utilized to deposit moieties which are protected from undesirable side-reactions by protecting groups which are attached to these molecules and which are later stripped away from the compound to produce the desired moiety. For instance, oxidizing chemistries to graft species containing carboxylates may use esterified carboxylate groups to prevent Kolbe electrolysis side reactions from occurring on the carboxylate groups and which are later de-esterified to produce the desired carboxylate groups.

The disclosed embodiments enable the expanded and tuned electrochemical operations based on surface functionalized pseudo-graphite materials which enable functional device capabilities which surpass the device capabilities possible with native pseudo-graphite material alone and provide enablement for a variety of useful applications and in particular for sensors applications.

Some examples of the operational modifications which may be provided by surface functionalization include modification of the operating window for a particular solution (solvent/electrolyte overpotentials), modification of surface interactions/adsorption for particular species, including modification of hydrophilicity/hydrophobicity and also modification of specific species interactions such as protons with amine groups, modification of zeta potential, modification of HET for particular electrochemical reactions, modification of the corrosion resistance of the surface, and modification of specific reactions that the pseudo-graphite material surface may undergo, e.g. reducing Kolbe-radical grafting to the pseudo-graphite material surface.

One application is for electrochemical sensing applications. Such applications include hypochlorite sensing by amine functionalized pseudo-graphite material, reference electrode behaviour by ferrocene functionalized pseudo-graphite material, pH sensing by oxidized pseudo-graphite material, COD sensing by functionalized pseudo-graphite material, for example diamond-like coated, oxidized, perhalo-cyclopropanoid grafted, etc., and protein rejection by PEGylated pseudo-graphite material for sensing interference elimination.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the methods, systems, and articles described herein. It will be noted that alternative embodiments of the methods, systems, and articles of the present disclosure may not include all of the features described yet still benefit from at least some of the advantages of such features. Those of ordinary skill in the art may readily devise their own implementations of the methods, systems, and articles that incorporate one or more of the features of the present disclosure.

The invention claimed is:

1. A method of fabricating an electrode, the method comprising:
   depositing a pseudo-graphite material onto a surface of an electrode substrate to produce a pseudo-graphite material surface, and
   chemically modifying the pseudo-graphite material surface with an electrochemically sensitive functional group to enhance a sensing property of the electrode, wherein chemically modifying the pseudo-graphite material surface comprises brominating a native pseudo-graphite material to produce a brominated pseudo-graphite material surface.

2. The method of claim 1, wherein modifying the pseudo-graphite material surface to enhance a sensing property of the electrode is performed before depositing the pseudo-graphite material onto the surface of an electrode substrate to produce the pseudo-graphite material surface.

3. The method of claim 1, further comprising modifying the brominated pseudo-graphite material surface by nucleophilic substitution with alkoxy-linked groups or hydroxyl groups.

4. The method of claim 1, wherein brominating the native pseudo-graphite material comprises exposing the native pseudo-graphite material to bromine ($Br_2$) gas at a temperature and a pressure sufficient to brominate the native pseudo-graphite material to produce the brominated pseudo-graphite material surface.

5. The method of claim 1, wherein brominating the native pseudo-graphite material comprises photolytic bromination of the native pseudo-graphite material using a liquid bromine compound.

6. The method of claim 1, wherein brominating the native pseudo-graphite material comprises reducing the native pseudo-graphite material and brominating the reduced pseudo-graphite material.

* * * * *